Patented Dec. 1, 1953

2,660,760

UNITED STATES PATENT OFFICE 2,660,760

METHOD OF PLASTER MOLDING RUBBER ARTICLES

James C. Moore, Ravenna, Ohio, assignor to The Oak Rubber Company, Ravenna, Ohio, a corporation of Ohio No Drawing. Application June 12, 1951, Serial No. 231,257

4 Claims. (Cl. 18—47.5)

This invention relates to an improved method of plaster molding rubber articles. The invention has to do with the formation of colored and solid rubber articles, such as toys or dolls, in plaster of Paris molds. Such articles, whether of natural or synthetic rubber, or other rubber-like material may have irregular surfaces with numerous projections and indentations. When such an article is molded in a plaster of Paris mold it is inevitable that powdery material from the mold will adhere to the surface of the molded article, and it is difficult to remove such powdery material, particularly from the cavities and indentations of an article having an irregular surface. The natural color of a plaster of Paris mold is white or light gray, and powder from it, when deposited upon a rubber article of a darker color, contaminates the color of the article.

In accordance with the method of the present invention the plaster mix from which the mold is made includes a coloring material, that is to say a pigment or a dye. In the preferred example of the method this coloring material is the same as that of the rubber mix. Hence any powder from the mold adhering to the surface of the rubber article, and especially to the cavities and indentations of that surface, has no contaminating effect upon the color of the article. If, for example, the article is a doll made of red rubber and there is more or less red powder from the mold adhering to it, nevertheless the red color of the doll is not contaminated in any way and its appearance is the same as though it had been made in a metal or other type of permanent mold.

In the method of plaster molding heretofore employed for making colored rubber articles, that is where the maintenance of unadulterated color is important, it has been customary to remove the plaster powder adhering to the surface of the rubber article by washing or scrubbing, and this step in the procedure has been time consuming and expensive, particularly where the surface of the article is irregular and comprises recesses or indentations. In my method this step is eliminated.

In a second example of the invention I include in the plaster of Paris mix a coloring material which contrasts with that used in the rubber mix, for example I may color the mold green and the rubber mix yellow. In the molding operation green powder is left upon the surface of the yellow rubber article. Assuming that the surface includes recesses and indentations, I may then buff or scrub off the more exposed portions of the article, thereby removing the green powder from those portions while it continues to adhere to the surface indentations. Thus by a skillful design of the article providing high and low surface portions, a pleasing decoration of two contrasting colors may be provided at much less expense than is involved in applying a contrasting color by means of hand decoration.

Certain conventional steps in the procedure of molding a small rubber article in a plaster of Paris mold may be followed in either of the above examples of my method. This may involve providing a mold that has an opening at one end into which the liquid rubber latex may be poured until the mold cavity is full, letting the mold stand with the opening uppermost long enough to enable the plaster to adsorb from the rubber latex adjacent the internal walls of the mold the moisture in that portion of the mix and thereby to cause the rubber adjacent to the walls to coagulate. Then, assuming that a hollow article is to be produced, the remaining liquid rubber mixture is poured out of the said opening, after which the coagulated rubber is given a permanent form as by a curing operation either before or after the article is removed from the mold. Alternatively the molding of such an article may involve the use of a mold that has no end opening, placing in the mold before it is closed a measured quantity of liquid rubber mix, closing the mold, revolving or otherwise agitating the mold while exposed to a temperature preferably somewhat higher than room temperature and thereby causing coagulation of the rubber in a layer of substantially constant thickness throughout the mold surfaces, and curing the coagulated rubber either before or after opening the mold and removing the article.

Having thus described my invention, I claim:

1. The method of forming in a plaster mold an article of rubber or the like having an irregular surface, which comprises making a plaster of Paris and water mixture containing a coloring material which permeates the mixture, forming a mold of said mixture comprising finely divided constituent powder loosely adhering to its surface, preparing a liquid rubber mixture containing a coloring material contrasting with the color of the plaster mold, drying said rubber mixture to coagulate it in a layer adjacent the internal walls of the mold, curing the coagulated rubber and removing from the more exposed surfaces of the article the adhering powder, whereby an article of two contrasting colors is produced.

2. The method of forming in a plaster mold an article of rubber or the like having projections and indentations in its surface, which comprises making a plaster of Paris and water mixture, adding a coloring material to the mixture, forming a mold of said mixture thus colored, said mold having on its internal surface projections and indentations and comprising finely divided similarly colored constituent powder loosely adhering to said internal surface, preparing a liquid latex mixture containing a coloring material in sufficient amount to impart a predetermined desired color throughout the mixture, introducing a quantity of said latex mixture into the mold, drying the said latex mixture in the mold to form a coagulated latex body, portions of the colored powder adhering to said latex body especially in the cavities and indentations of its surface when it is separated from the mold, and curing said latex body to form a molded article, whereby the appearance of the finished article is affected both by the basic color of the latex body and by the color of said powder.

3. The method of forming in a plaster mold an article of rubber or the like having projections and indentations in its surface, which comprises making a plaster of Paris and water mixture, adding a coloring material to the mixture, forming a mold of said mixture thus colored, said mold having on its internal surface projections and indentations and comprising finely divided similarly colored constituent powder loosely adhering to said internal surface, preparing a liquid latex mixture containing a coloring material in sufficient amount to impart a predetermined desired color throughout the mixture, introducing a quantity of said latex mixture into the mold, drying the said latex mixture in the mold to form a coagulated latex body, portions of said colored powder adhering to said latex body especially in the cavities and indentations of its surface, curing said latex body to form a molded article and buffing the article to remove powder from the outer exposed surfaces thereof, whereby the appearance of the finished article is affected both by the basic color of the latex body and by the color of said powder.

4. The method of forming an article of rubber or the like of a predetermined color in a plaster mold which comprises making a plaster of Paris and water mixture containing coloring material of the said predetermined color, forming a mold of said mixture comprising finely divided constituent powder loosely adhering to the surface of the mold, preparing a liquid latex mixture containinng a coloring material of the said predetermined color, introducing a quantity of said colored latex mixture into the mold, drying said colored latex mixture in the mold to form a coagulated latex body, portions of said colored powder adhering to said latex body especially in the cavities and indentations of its surface, and curing said colored latex body to form a molded article, whereby any powdery material from the mold adhering to the article will be of the same color as the article and will eliminate the necessity of scrubbing the article in order to maintain its color uncontaminated.

JAMES C. MOORE.

References Cited in the file of this patent

UNITED STATES PATENTS

| Number | Name | Date |
|---|---|---|
| Re. 18,437 | Pestalozza | Apr. 26, 1932 |
| 99,479 | Robbins | Feb. 1, 1870 |
| 1,825,738 | Klein | Oct. 6, 1931 |
| 2,250,958 | Kautter | July 29, 1941 |
| 2,294,071 | Carter | Aug. 25, 1942 |